United States Patent [19]
Anderson et al.

[11] Patent Number: 5,923,805
[45] Date of Patent: Jul. 13, 1999

[54] CONNECTOR FOR PLASTIC OPTICAL FIBER

[75] Inventors: Jerry Max Anderson, Austell; Arthur Wallace Carlisle, Dunwoody, both of Ga.; Gary J. Grimes, Birmingham, Ala.; Norman Roger Lampert, Norcross, Ga.; Charles Joseph Sherman, Westminster, Colo.

[73] Assignee: Lucent Technologies Inc., Murray Hill, N.J.

[21] Appl. No.: 08/995,643

[22] Filed: Dec. 22, 1997

[51] Int. Cl.$^6$ ........................................... G02B 6/36
[52] U.S. Cl. ................................. 385/86; 385/56; 385/60; 385/77; 385/78; 385/139
[58] Field of Search .................................. 385/53, 56, 59, 385/60, 62, 76, 78, 77, 81, 86, 87, 88, 89, 139

[56] References Cited

U.S. PATENT DOCUMENTS

| | | | |
|---|---|---|---|
| 4,681,400 | 7/1987 | Ueba et al. | 428/373 |
| 4,762,392 | 8/1988 | Yamamoto et al. | 427/163 |
| 4,768,860 | 9/1988 | Tatsukami et al. | 428/378 |
| 4,784,456 | 11/1988 | Smith | 385/76 X |
| 4,897,457 | 1/1990 | Nakamura et al. | 526/247 |
| 4,910,276 | 3/1990 | Nakamura et al. | 526/247 |
| 4,934,784 | 6/1990 | Mathis et al. | 385/76 X |
| 5,016,968 | 5/1991 | Hammond et al. | 385/76 X |
| 5,044,719 | 9/1991 | Nakamura | 385/76 |
| 5,119,455 | 6/1992 | Jennings et al. | 385/81 |
| 5,212,752 | 5/1993 | Stephenson et al. | 385/78 |
| 5,452,386 | 9/1995 | Van Woesik | 385/72 |
| 5,481,634 | 1/1996 | Anderson et al. | 385/76 |

OTHER PUBLICATIONS

S. E. Miller, et al. eds., Optical Fiber Telecommunications II, Academic Press, Inc., 1988, 301–325.

"Plastic Optical Fiber And HCS® Fiber Cable And Connectors For Versatile Link," Hewlett Packard product brochure.

"Proposal of SMI (Small Multi–media Interface) Connector for Long Distance IEEE 1394", IEEE p. 1394.b meeting, Fort Lauderdale, Dec. 2–3, 1997.

"FO7 Duplex Plastic Fiber System," AMP Catalog 889058, May 1997.

*Primary Examiner*—Brian Healy
*Attorney, Agent, or Firm*—Michael A. Morra

[57] ABSTRACT

An optical connector is disclosed for terminating an optical cable 10 comprising a plastic optical fiber 11 surrounded by a protective jacket 12. The connector includes a housing having an exterior latch 201 that secures it to an adapter 31. The latch is constructed as a cantilever with its fixed end positioned toward a front end of the housing. The connector further includes a cable-holding structure that attaches to the jacket of the optical cable in such a manner that the plastic optical fiber 11 connects to an associated optical device without the use of a ferrule. One cable-holding structure includes a guide tube 45 that is made from metal and is pressed, or insert molded, into the back end of one plastic housing 40. A portion of the guide tube protrudes from the back end of the housing and is crimped onto the optical cable. Here, the optical cable is immovably attached to the housing. Another cable-holding structure includes an extender cap 21, a spring 60, and a guide tube 15 having an enlarged diameter at one end 16. The spring surrounds the tube and presses against its enlarged end. The spring also presses against an interior surface of the extender cap, which inserts into the back end of another plastic housing 22. Here, the optical cable is movably attached to the housing.

21 Claims, 5 Drawing Sheets

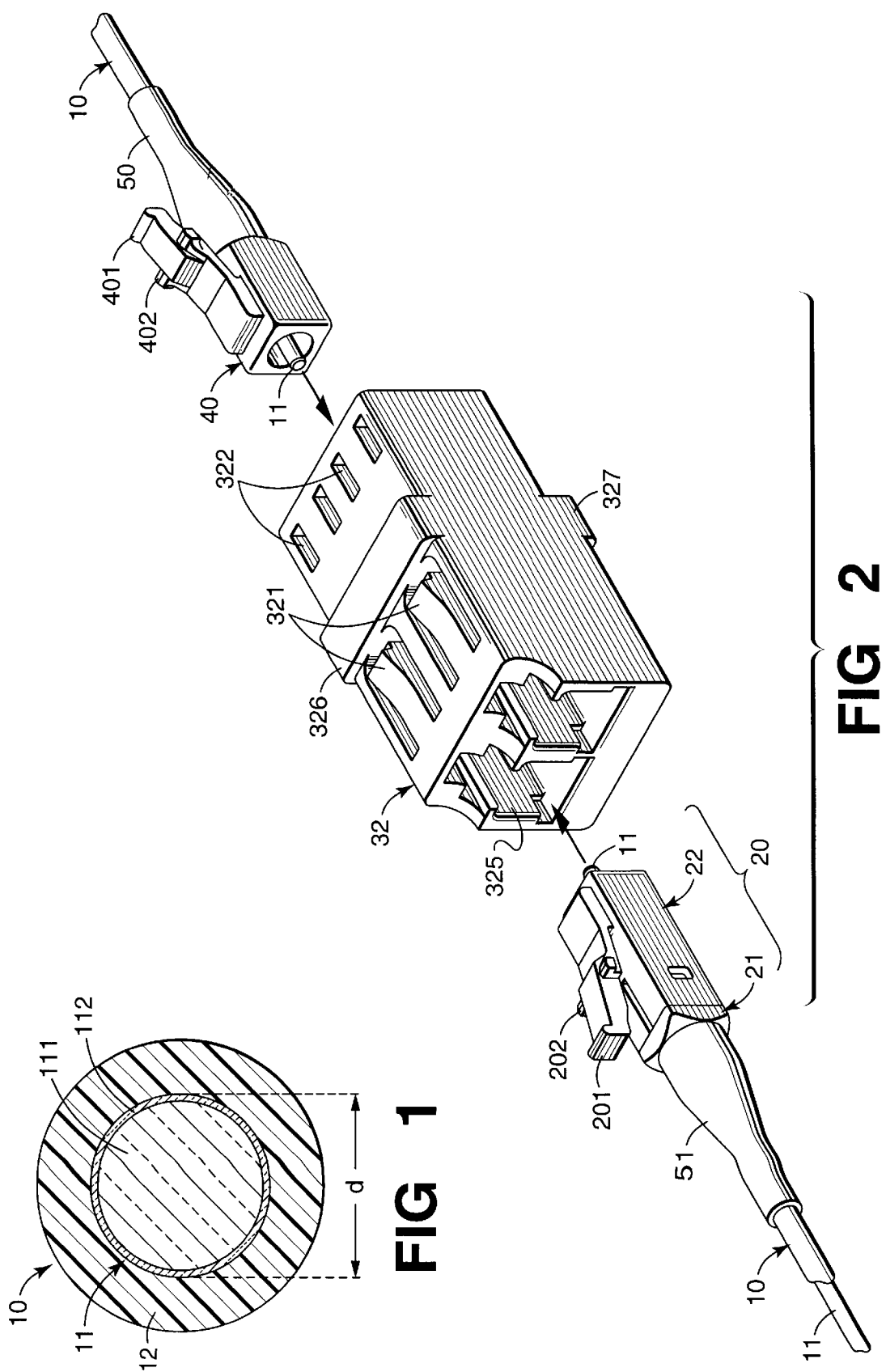

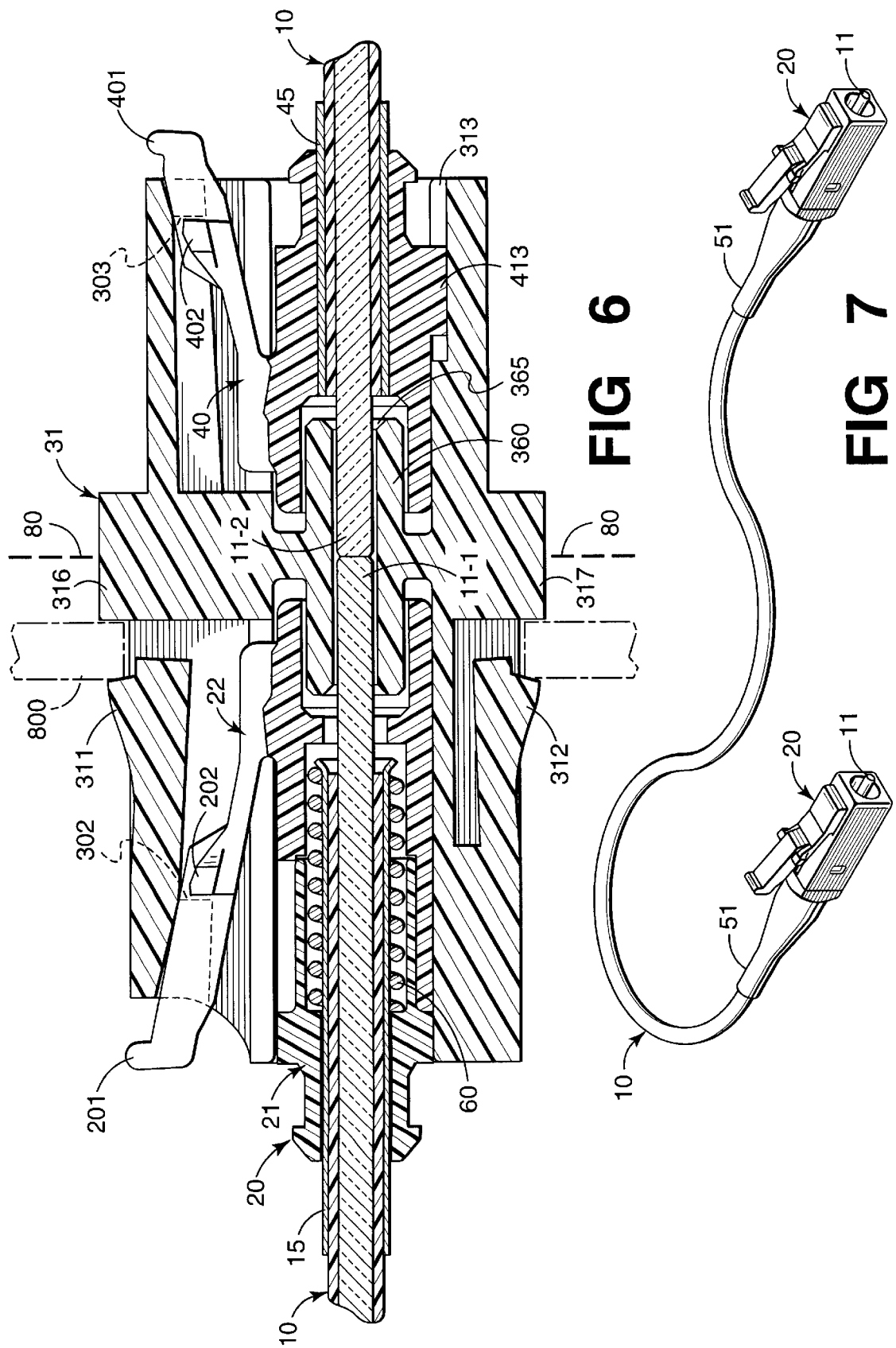

CONNECTOR FOR PLASTIC OPTICAL FIBER

TECHNICAL FIELD

This invention relates to optical connectors, and more particularly to a simplified connector having a minimum number of parts.

BACKGROUND OF THE INVENTION

Optical connectors are an vital part of any optical fiber communication system. For instance, such connectors may be used to join segments of fiber into longer lengths; to connect optical fibers to active devices such as a radiation sources and detectors; or to connect optical fibers to passive devices such as switches and attenuators. The central function of an optical connector is the maintenance of two optical fiber ends such that the core of one of the fibers is axially aligned with the core of the other fiber; and consequently, all of the light from one fiber is coupled to the other fiber. This is a particularly challenging task when the light-carrying region (core) of an optical fiber is quite small. In singlemode optical fibers, for example, the core diameter is only about 9 microns. Less demanding, although still challenging, are multimode fibers that are made from glass and have fiber core diameters that are typically 50 or 62.5 microns.

Another function of the optical connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects).

A variety of optical fiber connectors are known in the art, and a discussion of same is provided at pages 301–325 of the textbook entitled *Optical Fiber Telecommunications II*, which was edited by S. E. Miller and I. P. Kaminow, Academic Press (1988). Optical fiber connectors are typically assembled using a ferrule, which is a solid cylinder having a narrow passageway that extends along its central axis through which a glass or plastic optical fiber is threaded. The ferrule has a circular cross section with the passageway positioned precisely at its centroid, and such precision does not come cheaply. Threading the fiber is normally accomplished by special equipment at a manufacturing location or by a skilled technician in the field. Moreover, adhesive materials are required to hold the fiber within the passageway of the ferrule; and so the use of such ferrules is both inconvenient and expensive.

Optical connectors use a ferrule for alignment and support of the fiber, whether it is made from glass or plastic. A typical example of an optical fiber connector that uses a glass fiber within a ferrule is shown in U.S. Pat. No. 4,934,785. Examples of optical fiber connectors that use a plastic fiber within a ferrule include:

(i) the F07 Duplex Plastic Fiber System from AMP;
(ii) the SMI (Small Multi-media Interface) Connector from Sony Corporation; and
(iii) the HFBR series of plastic fiber connectors from Hewlett Packard.

U.S. Pat. No. 5,719,977 discloses an optical connector having an immovable ferrule, which substantially reduces the cost and complexity of such connectors. However, it still uses a ferrule and still requires a skilled technician to make field installations.

Accordingly, what is desired is a simpler and less-expensive optical connector that overcomes the above limitations and which can be conveniently installed onto an optical cable in the field by a non-skilled person.

SUMMARY OF THE INVENTION

The connector of the present invention is used for terminating an optical cable comprising a plastic optical fiber surrounded by a jacket. The connector includes a housing having an exterior latch that secures it to an associated receptacle. The latch is constructed as a cantilever with its fixed end positioned toward a front end of the housing. The housing includes a longitudinal passageway for receiving the optical cable into its interior, and it extends from a back end of the housing toward its front end. The connector further includes a cable-holding structure for attachment to the jacket of the optical cable in such a manner that the plastic optical fiber can be connected to an associated optical device without the use of a ferrule.

In an illustrative embodiment of the invention, the cable-holding structure comprises a guide tube that is made from metal and is pressed, or insert molded, into the back end of a plastic housing. A portion of the guide tube protrudes from the back end of the housing and is crimped onto the optical cable. In this embodiment, the optical cable is immovably attached to the housing.

In another illustrative embodiment of the invention, the cable-holding structure comprises an extender cap, a spring, and a cylindrical tube having an enlarged diameter at one end. The spring surrounds the tube and presses against the enlarged end. The spring also presses against an interior surface of the extender cap, which inserts into the back end of the housing. In this embodiment, the optical cable is movably attached to the housing.

In yet another illustrative embodiment of the invention, a pair of the above-described connectors are attached to the ends of an optical cable to form a jumper cord.

The present invention recognizes that even though plastic optical fiber has greater loss and less bandwidth than glass optical fiber, it is still adequate to satisfy most communication needs now and into the foreseeable future for short distance communication systems. The present invention takes advantage of the fact that plastic optical fibers do not presently have the very small core (light carrying region) needed for large-bandwidth transmission, and alignment precision is traded for design simplicity. Indeed, the design is so simple that the connectors of the present invention can be assembled to an optical cable by nearly anyone. Moreover, it has been found that by reducing the number of parts needed for the construction of the present connector, that its overall cost and size can be significantly reduced.

BRIEF DESCRIPTION OF THE DRAWING

The invention and its mode of operation will be more clearly understood from the following detailed description when read with the appended drawing in which:

FIG. 1 is a cross section view of a cable containing a plastic optical fiber;

FIG. 2 is a perspective view of a pair of optical connectors, according to the present invention, prior to interconnection via a duplex adapter;

FIG. 6 is a cross-section view of a spring-loaded optical connector (on the left) interconnected to an non-spring-loaded optical connector via an adapter; and FIG. 7 shows a jumper cord comprising an optical cable, having plastic fiber, and an optical connector at each end.

DETAILED DESCRIPTION

Figure 3:
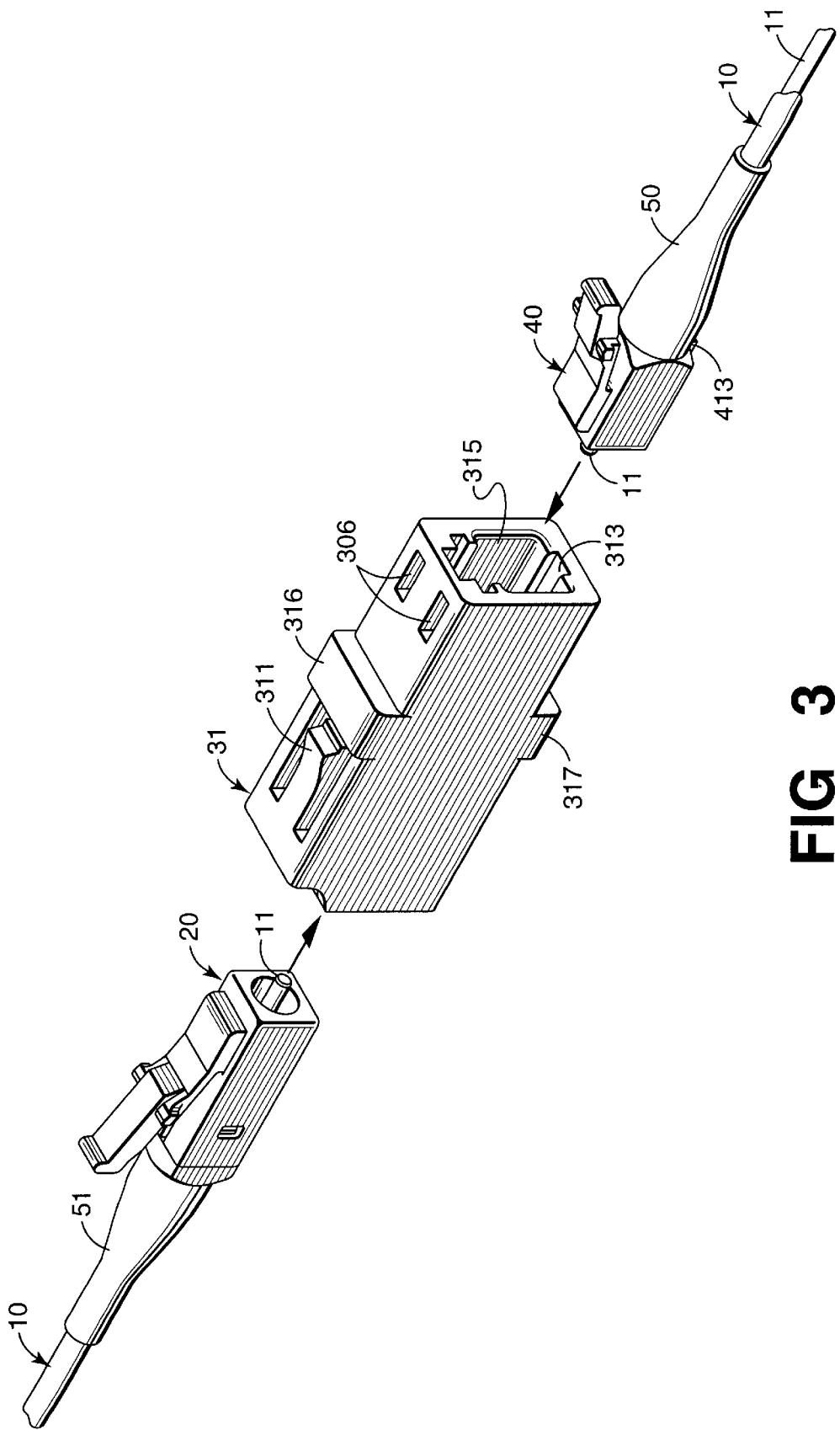
FIG. 3 is a perspective view of a pair of optical connectors, according to the present invention, prior to interconnection via a simplex adapter.

Known optical connectors, such as the ST, SC, FC and biconic connectors, use many parts—a minimum comprising: (i) cable-boot, (ii) barrel, (iii) ferrule, (iv) spring, and (v) plug housing. Additional parts may also be required such as washers, retainer clips, a cap to restrain the spring, crimp-sleeves and various inserts. It has been determined that a substantial simplification in the design of an optical connector plug can be achieved by eliminating the ferrule that traditionally supports the end portion of the optical fiber, and using the connector only to support an end portion of the optical fiber and to make attachment to an associated receptacle. Optical fibers that are made from glass are generally too thin and have a core diameter that is too small (about 9 microns for singlemode fiber, where 1 micron=$10^{-6}$ meters) to be successfully aligned with another glass fiber without a precision ferrule and alignment sleeve. However, when the core diameter exceeds about 300 micrometers ($\mu$m), the need for the precision ferrule and alignment sleeve is substantially eliminated. In this situation, the connector plug only needs to support the end portion of the optical fiber and its design can be simplified to the point that it can be field installed by nearly anyone. And while the preparation of the end face of a glass optical fiber is somewhat involved, the preparation of the end face of a plastic optical fiber is relatively easy.

FIG. 1 is a cross-section view of an optical cable 10 comprising a plastic optical fiber 11 surrounded by a protective jacket 12. Optical fiber 11 has a transparent core 111 and cladding layer 112; and in order to guide light through the fiber, the core must have a higher index of refraction than the cladding. Illustratively, the optical fiber has an outer diameter (d), which is about one (1.0) millimeter in the preferred embodiment, wherein the cladding comprises a thin layer of a fluoropolymer whose thickness is less than about twenty-five (25) microns. Core 111 is made from polymethyl methacrylate. Plastic fibers of this type have a refractive index profile such that it has one index of refraction within the core 111 and another index of refraction in the cladding 112. This is known as a "step-index" profile, and plastic fibers of this type are generally disclosed in U.S. Pat. Nos.:4,681,400; 4,762,392; and 4,768,860. Additionally, plastic optical fibers may also be constructed having a relatively high index of refraction at the core center that gradually decreases as the distance from the center increases. This is known as a "graded-index" profile. Improved plastics are now available to make graded-index optical fibers having low loss and high bandwidth with no serious absorption loss over the wavelength region extending from visible to 1300 nanometers. Such plastics are generally disclosed in U.S. Pat. Nos.: 4,897,457; and 4,910,276.

Illustratively, the protective jacket 12 has a thickness of about 0.5 mm and is made from a material such as nylon to provide strength and abrasion resistance during handling. Additionally, the protective jacket 12 is opaque so that ambient lighting will not interfere with lightwave signals traveling in the core 111 of the plastic fiber 11.

Reference is now made to FIG. 2, which shows a perspective view of a spring-loaded optical connector 20 that is about to be connected, via duplex adapter 32, to a non spring-loaded optical connector 40. Optical connector 20 supports an end portion of optical cable 10 in such a manner that plastic fiber 11 extends beyond the front end of the connector 20. Similarly, optical connector 40 supports an end portion of another optical cable 10 in such a manner that plastic fiber 11 extends beyond the front end of the connector 40. Unlike prior-art optical connectors, optical fiber 11 is not installed in a ferrule, and this significantly simplifies the construction of the present connectors.

Optical connector 20 comprises plastic housing parts 21, 22 that attach to a bend-limiting boot 51 at the back end of an extender cap 21 in order to protect optical cable 10 from excessively sharp bends, which may cause a high degree of optical signal loss. The outside surface of the connector 20 includes a movable spring-latch 201 which is used for securing the connector to an associated receptacle (e.g., duplex adapter 32) in order to prevent unintended decoupling between the two. The connector and latch are molded from a commodity thermoplastic, preferably polycarbonate, in order to achieve a low-cost, lightweight housing. Spring-latch 201 is molded into the housing and includes a living hinge that allows it to be moved up and down in a direction which is perpendicular to a central axis of the connector 20. Cantilever latch 201 is approximately 2.3 mm wide, 9.0 mm long, and has a minimum thickness of about 0.65 mm. The latch 201 includes a pair of shoulders 202 that are positioned on its opposite sides. These shoulders are automatically deflected downward during insertion into cavity 325 of adapter 32.

Optical connector 40 comprises a plastic housing that attaches to a bend-limiting boot 50 at the back end the housing in order to protect optical cable 10 from excessively sharp bends which may cause a high degree of optical signal loss. The outside surface of the connector 40 includes a movable spring-latch 401 which is used for securing the connector to an associated receptacle (e.g., duplex adapter 32) in order to prevent unintended decoupling between the two. The connector and latch are molded from a commodity thermoplastic, preferably polycarbonate, in order to achieve a low-cost, lightweight housing. Spring-latch 401 is molded into the housing and includes a living hinge that allows it to be moved up and down in a direction which is perpendicular to a central axis of the connector 40. Cantilever latch 401 includes a shoulder 402 that interlocks with a latch-retaining wall within a cavity in the opposite side of adapter 32. These latch-retaining walls are created during the molding of adapter 32 by mold-tool cores that extend into the interior of adapter through openings 322 and around the panel latches 321. Flanges 326, 327 are molded into adapter 32, and cooperate with panel latches 321 to secure the adapter within a rectangular opening of a panel.

FIG. 3 shows a reverse perspective view, vis á vis FIG. 2, of spring-loaded optical connector 20 that is about to be connected, via simplex adapter 31, to non spring-loaded optical connector 40. An important difference between cavity 325 (see FIG. 2) and cavity 315 is the presence of a keyway 313 that accommodates a key 413, which is positioned on the bottom side of connector 40. Note that key 413 precludes connector 40 from being inserted into cavity 325 (see FIG. 2). In this manner, optical connectors 40 that are not spring loaded cannot be connected to each other. Such interconnection might result in damage to the end faces of the plastic optical fibers 11, or the end faces might not touch each other and the optical signal loss between fibers would be too great. On the other hand, spring-loaded connectors 20 do not include a similar key, and they can be connected together or to any other optical device. Finally, panel latch 311, flanges 316, 317 and openings 306 that are associated with simplex adapter 31 correspond functionally with panel latch 321, flanges 326, 327 and openings that are associated with duplex adapter 32 shown in FIG. 2.

Cable-Holding Structures

Discussed below are various cable-holding structures that are contemplated by the present invention. These cable-holding structures are characterized by three features: (1) the structure makes attachment to the jacket of an optical cable so that tensile forces applied to the cable are transferred to the structure—and ultimately to the housing; (2) the structure supports the cable in such a manner that plastic optical fiber, without the jacket, extends beyond the structure toward the front end of the housing; and (3) the structure does not include a ferrule.

Figure 4:
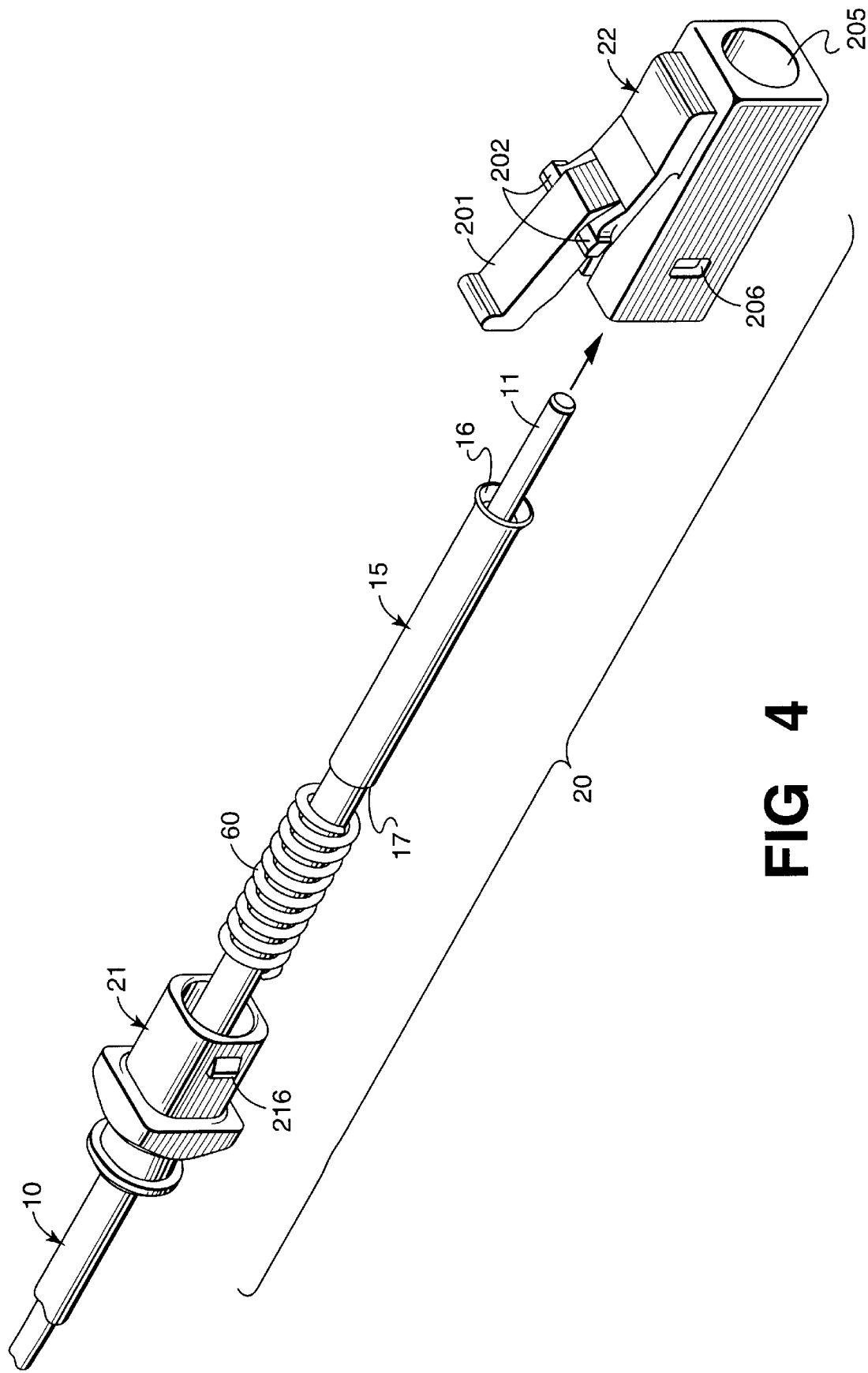
FIG. 4 is an exploded perspective view of a spring-loaded optical connector in accordance with the present invention.

FIG. 4 shows an exploded perspective view of a first embodiment of a cable-holding structure. In this embodiment, the plastic fiber is longitudinally movable within spring loaded optical connector 20. The cable-holding structure comprises an extender cap 21, a spring 60, and a guide tube 15 that is enlarged at its proximal end 16. As is apparent, this simple connector is suitable for quick and easy attachment to one or both ends of an optical cable containing plastic optical fiber. (In the simplest case, the plug is pre-assembled at the factory by axially aligning extender cap 21, spring 60, guide tube 15, plug body 22; and firmly pressing these parts together. The extender cap 21 includes one or more wedges 216 that fit into, and interlock with, one or more openings 206 in the housing 22.) Optical cable 10 is prepared by removing its jacket 12 (see FIG. 1) from an end portion of the cable and leaving plastic optical fiber 11 fully exposed without a ferrule. If a bend-limiting boot is used, it is mounted on optical cable 10 first. When the guide tube 15 is made from plastic, an anaerobic adhesive may be used to make attachment to cable 10. Preferably, the guide tube is made from aluminum or nickel-plated brass, in which case attachment is readily accomplished by deforming (crimping) the guide tube at its distal end 17 after the connector 20 is positioned over the prepared cable. In all cases, the guide tube 15 has an inner diameter that is slightly greater than the outer diameter of the optical cable 10. Additionally, the enlarged proximal end 16 of the tube has a diameter that precludes spring 60 from moving beyond the proximal end. Advantageously, the enlargement is created by flaring proximal end 16. Once assembled, the exposed plastic fiber 11 protrudes through opening 205 at the front end of the housing 22.

It is noted that the optical cable might include a pair plastic optical fibers without departing from the spirit and scope of the present invention. In this case, the jacket is removed from the end portions of both plastic fibers. Moreover, the interior of guide tube 15 would be shaped to accommodate the exterior shape of this dual-fiber cable. However, for simplicity and clarity, only the single-fiber optical cable is discussed.

Figure 5:
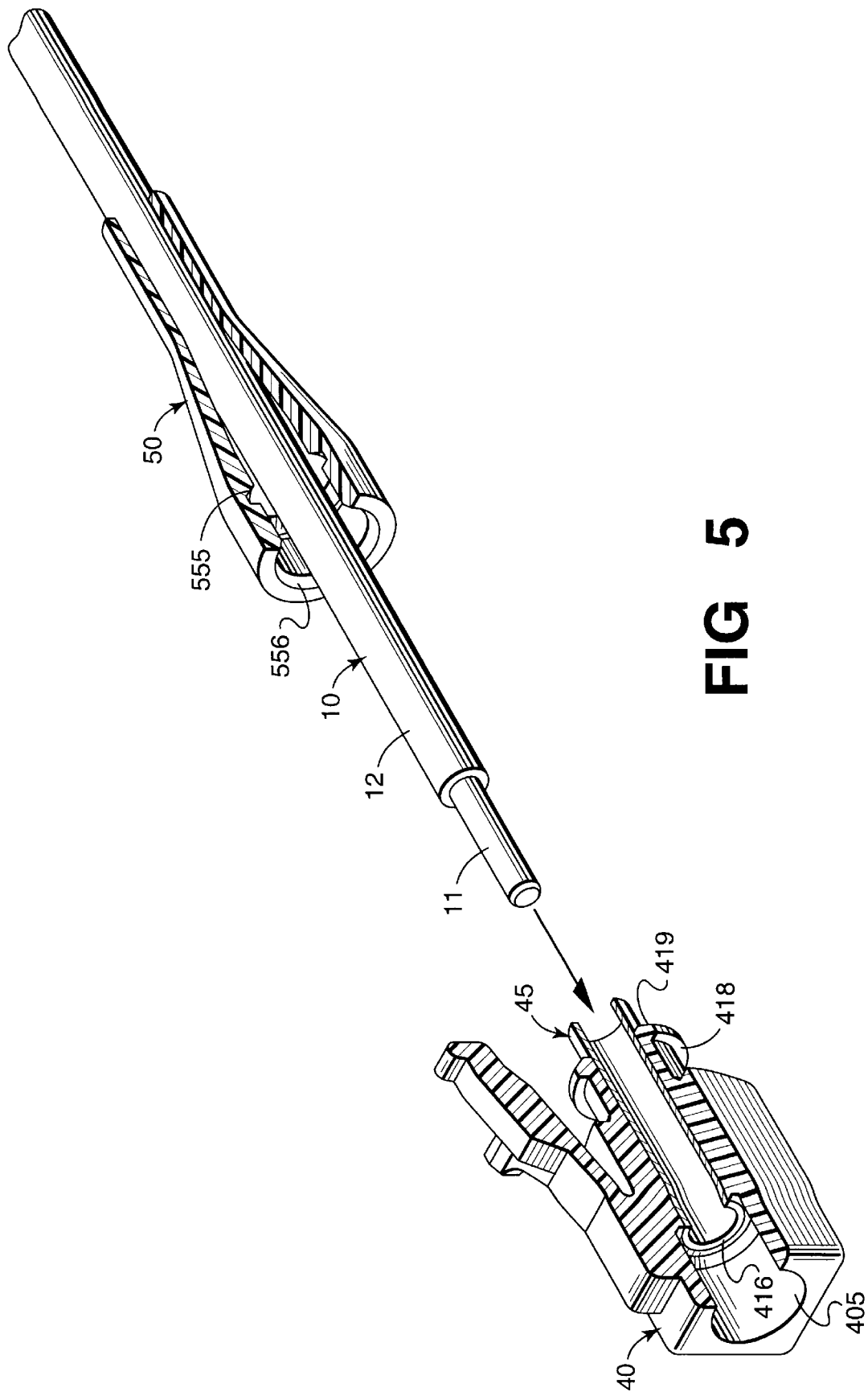
FIG. 5 is an exploded perspective view of a non spring-loaded optical connector, in accordance with the present invention, with a quarter section of its housing and bend-limiting boot removed to show details of its construction.

FIG. 5 shows an exploded perspective view of a second embodiment of a cable-holding structure. In this embodiment, the plastic fiber is not movable within the optical connector 40. In this figure, a quarter section of the housing and bend-limiting boot 50 is removed to provide greater detail regarding construction and assembly. The boot is made from a suitably compliant material so that its back portion can be bent in a direction that is normal to its longitudinal axis. In the preferred embodiment of the invention, the bend-limiting boot is made from a thermoplastic rubber such as Santoprene® elastomer which is commercially available from Advanced Elastomer Systems, LP. The boot easily fits over a lip 418 at the back end of the connector 40 (lip 418 includes a bevel 419, and the front end of the boot 50 also includes a bevel 556). A groove 555 within the boot is shaped to mate with lip 418 so that the boot will stay attached to the connector during normal handling.

In this second embodiment of a cable-holding structure, guide tube 45 is a hollow metal tube that is press fit into the back end of connector 40; although the connector, which is made from a thermoplastic material, can either be over-molded onto the guide tube or the tube can be made from plastic and integrally molded into the housing. When the guide tube 45 is made from metal, it needs to extend beyond the back end of connector 40 so that it can be easily crimped onto the optical cable 10. And when the guide tube merely comprises an axial passage through the plastic connector 40, attachment to the optical cable is accomplished with an anaerobic adhesive. However, in this situation the connector should be made from polyetherimide rather than polycarbonate, which is normally preferred, because anaerobic adhesives damage polycarbonate.

Another embodiment of a cable-holding structure can be used for attaching the connector 40 to the cable 10. Although not shown in FIG. 5, one or more sidewalls of the plastic connector 40 might include a cantilever member that deflects into the axial passage that holds the optical cable. Each cantilever member is designed with an interior edge that digs into and holds the jacket of the optical cable. Moreover, each cantilever member is designed to lock into its deflected state. Advantageously, an all-plastic connector can thus be molded as a single part, which attaches to the optical cable without crimping or adhesives.

In yet another embodiment, guide tube 45 includes threads on its inner surface wall that allow the connector to be screwed onto the cable 10.

In all of the above embodiments, the jacket is removed from an end portion of the optical cable 10 to expose a length of plastic optical fiber 11. The optical cable is then installed in the guide tube and attached thereto by any of the above-described techniques. The end face of the plastic optical fiber 11 is prepared by a polishing operation in which an abrasive surface is rubbed against it, or the end face is pressed against a heated surface. In either case, a smooth end face is desired that is generally planar and normal to the longitudinal axis of the fiber. A predetermined length of plastic fiber 11 protrudes beyond the front end of the connector through opening 405 to assure end face contact.

FIG. 6 discloses an almost-symmetrical interconnection between a pair of plastic optical fibers meeting at optical plane 80. An while a connector-to-connector example is shown, it is clear that a connector can be joined to other optical devices. Optical fibers 11-1, 11-2 are coaxially aligned when they are inserted into boss 360, which extends between the cavities that contain connectors 20 and 40. A chamfer 365 assists entry of the plastic optical fibers into the boss. And because there is less need for precision in this connection arrangement, there is no need for a separate alignment sleeve, which is normally installed within the boss 360. A compression spring 60 surrounds guide tube 15 and urges plastic optical fiber 11-1 into engagement with plastic optical fiber 11-2. It is noted that only one of the connectors (i.e., connector 20) needs to be spring loaded to assure that the end faces of the plastic fibers 11-1, 11-2 will not be separated by an air gap.

When connector 20 is inserted into the left-hand side of adapter 31, its plastic fiber 11-1 overtravels the optical plane (transverse centerline) 80. Thereafter, when connector 40 is inserted into the right-hand side of adapter 31, contact between the end faces of the two plastic fibers 11-1, 11-2 is made, plastic fiber 11-1 is pushed backwards while compression spring 60 maintains a constant, predetermined pressure on the fiber end faces. If connector 40 is installed first, as is typically the case, then when connector 20 is inserted into the adapter, fibers 11-1, 11-2 meet at the optical plane 80 and the housing 22 moves forward in a temporary over-travel condition and compresses spring 60, thereby enabling connector 20 to latch. Latches 201 and 401 have shoulders 202 and 402 that interlock with latch-retaining walls 302, 303 respectively.

Adapter 31 includes panel-locking members 311, 312 which cooperate with flanges 316, 317 to capture an edge of panel 800 therebetween. Illustratively, the right-hand side of FIG. 6 comprises connections that are referred to as "inside wiring" because they reside behind panel 800 and are not readily accessible during normal usage. Similarly, the left-hand side of FIG. 6 comprises connections that are referred to as "outside wiring" because they reside on the side of panel 800 which is accessed during normal usage. Indeed, it is particularly useful to exclusively use optical connectors 40 having non spring-loaded connectors on the "inside wiring" side of an equipment bay or the like. In this manner, one can be sure that two non spring-loaded connectors 40 will never be interconnected. Nevertheless, connector 40 is shown having a key 413 that only permits it to be inserted into an adapter having a mating keyway 313. FIG. 6 usefully illustrates the simplicity of a non spring loaded connector 40 by placing it adjacent to spring-loaded connector 20. Note that optical cable 10 fits into metallic guide tube 45, which is crimped onto it. As was discussed above, guide tube 45 could be plastic and, hence, integrally molded as part of connector 40

FIG. 7 shows a jumper cord comprising an optical cable 10 having a spring-loaded connector 20 attached at each end. A plastic optical fiber 11 protrudes from the front end of each connector, and a bend limiting boot 51 is attached to the back end of each connector. Advantageously, such jumper cords can be easily assembled in the field by non-skilled persons thereby permitting cord lengths to be customized.

Although various particular embodiments of the present invention have been shown and described, modifications are possible within the spirit and scope of the invention. These modifications include, but are not limited to, the use of different materials in the construction of the connector and the use of multiple plastic optical fibers within the connector. And although cladded plastic fiber having a step-index profile is shown, it is possible to use graded-index plastic fiber. And while a plastic fiber having a nominal diameter of 1.0 mm is indicated, the present invention contemplates use with all plastic optical fibers whose diameters are greater than about 300 µm. And even though the connector of the present invention preferably uses a cantilever-style latch, it is understood that other latch styles are possible.

We claim:

1. A connector for attachment to an optical cable, which comprises at least one plastic optical fiber surrounded by a jacket, said connector including a housing having a latch for securing it to an associated receptacle, the housing including a longitudinal passageway that extends from a back end of the housing toward a front end thereof, said passageway being sized to receive the optical cable,

CHARACTERIZED BY a cable-holding structure that attaches to the jacket of the optical cable in a manner that enables the plastic optical fiber to be connected to an optical device without the use of a ferrule; and wherein the latch comprises a single cantilever that is disposed on an outside surface of the housing, said cantilever having a fixed end that is positioned toward the front end of the housing and a free end that is positioned toward the back end of the housing.

2. The connector of claim 1 wherein the cable-holding structure includes a guide tube that is positioned at the back end of the housing, said tube having an inner diameter that is slightly greater than the outer diameter of the optical cable.

3. The connector of claim 2 wherein the guide tube is made from metal, said tube extending beyond the back end of the housing by an amount that enables it to be crimped to the cable.

4. The connector of claim 2 wherein the cable-holding structure further includes an extender cap that inserts into the back end of the housing.

5. The connector of claim 4 wherein the cable-holding structure further includes a spring member that surrounds the guide tube.

6. A connector for attachment to an optical cable, which comprises a plastic optical fiber surrounded by a jacket, said connector including:

a housing having a latch for securing it to an associated receptacle, the housing including a longitudinal passageway that extends from a back end of the housing toward a front end thereof; and a metallic tube having an axial passageway for receiving the end portion of the optical cable, the tube being immovably held within the longitudinal passageway of the housing, said tube having an inner diameter that is slightly greater than the outer diameter of the optical cable, and said tube extending beyond the back end of the housing by an amount that enables it to be crimped onto the cable.

7. In combination, an optical connector attached to an end portion of an optical cable the optical cable including a transparent plastic optical fiber surrounded by an opaque jacket, said plastic optical fiber having a diameter that exceeds 300 micrometers, said jacket being removed from an end portion of the optical cable to expose the plastic optical fiber the optical connector including:

a molded plastic housing including a longitudinal passageway that extends from a back end of the housing toward a front end thereof; and a cable-holding structure mounted within the longitudinal passageway of the housing, said cable-holding structure comprising an extender cap that interlocks with the back end of the housing, a spring member, and a cylindrical tube having an enlarged diameter at one end, the cylindrical tube being firmly attached to the jacket of the optical cable, said spring member being disposed around the outside of the tube and pressing against its enlarged end and against an interior surface of the extender cap; whereby the exposed plastic optical fiber is longitudinally movable within the connector.

8. In combination, an optical connector attached to an end portion of an optical cable, the optical cable including a transparent plastic optical fiber surrounded by an opaque jacket, said plastic optical fiber having a diameter that exceeds 300 micrometers, said jacket being removed from an end portion of the optical cable to expose the plastic optical fiber the optical connector including:

a housing having a latch for securing it to a jack receptacle, the housing being molded from a thermoplastic material and including a longitudinal passageway for receiving the optical cable into its interior, the passageway extending from a back end of the housing toward a front end thereof;

means for immovably holding the optical cable within the longitudinal passageway of the housing such that the exposed plastic optical fiber extends beyond its front end for making end-to-end connection with an optical device without the use of a ferrule.

9. The connector of claim 8 wherein the latch comprises a single cantilever that is disposed on an outside surface of the housing, said cantilever having a fixed end that is positioned toward the front end of the housing and a free end that is positioned toward the back end of the housing.

10. The connector of claim 8 wherein the housing further includes a key that prevents it from being inserted into a jack receptacle that does not include a mating keyway.

11. The connector of claim 8 further including a bend-limiting boot that surrounds the back end of the housing.

12. An optical interconnection between first and second optical connectors, each having a longitudinal axis and a front end, said front ends being joined together end-to-end within an adapter, the first optical connector comprising a plastic housing having a latch member on an outside surface thereof for securing it to an input side of the adapter, and a plastic optical fiber which is immovably attached to the housing and which extends beyond its front end without a ferrule;

the second optical connector comprising a plastic housing having a latch member on an outside surface thereof for securing it to an output side of the adapter, and a plastic optical fiber which is movably attached to the housing and which extends beyond its front end without a ferrule; and the adapter including a pair of back-to-back cavities for receiving the front ends of the first and second optical connectors, each cavity having means for interlocking with said the latch members, a cylindrical passageway extending between the cavities and holding the plastic optical fibers in axial alignment without the use of ferrules.

13. The optical interconnection of claim 12 wherein the plastic optical fibers each have a diameter of about 1.0 millimeters.

14. The optical interconnection of claim 12 wherein the first optical connector includes a key which prevents it from being inserted into any cavity of the adapter that does not include a mating keyway.

15. A jumper cord comprising a length of optical cable having a connector affixed to at least one end of the cable the connector including an exterior latch for securing it to an associated receptacle, the latch comprising a cantilever having its fixed end positioned toward a front end of the connector, the connector further including a longitudinal passageway for receiving the optical cable into its interior, the passageway extending from a back end of the connector toward the front end thereof;

the optical cable including a plastic fiber having a diameter that is greater than 300 micrometers, said plastic fiber being surrounded by a layer of jacket material that is tightly coupled to the plastic fiber, the jacket material being removed from an end portion of the optical cable such that the plastic fiber is fully exposed at the front end of the connector; and a tubular member that surrounds the jacket material adjacent to the end portion of the optical cable and is tightly coupled thereto, said tubular member being captured within the connector.

16. The jumper cord of claim 15 wherein the optical cable is tightly coupled to the tubular member by means of an adhesive.

17. The jumper cord of claim 15 wherein the tubular member comprises a hollow metal tube that is crimped onto the optical cable.

18. The jumper cord of claim 17 wherein the connector comprises a thermoplastic housing that is overmolded onto the hollow metal tube.

19. The jumper cord of claim 17 wherein the connector comprises a plastic. housing and wherein the hollow metal tube is press fit onto a back end thereof.

20. The jumper cord of claim 15 wherein the tubular member is longitudinally movable within the connector.

21. The jumper cord of claim 20 wherein the tubular member is surrounded by a spring that presses against an enlarged portion of the tubular member and against an interior surface of the connector to urge the exposed plastic fiber toward the front end of the connector.

* * * * *